3,331,736
MODIFIED LARYNGOTRACHEITIS VACCINE
Emil F. Gelenczei, Madison, Wis., assignor to Schering Corporation, Bloomfield, N.J., a corporation of New Jersey
No Drawing. Filed Feb. 11, 1963, Ser. No. 259,771
3 Claims. (Cl. 167—78)

My invention relates to an improvement in vaccines for the prophylactic immunization of chickens and other fowl against infectious laryngotracheitis and to an improved laryngotracheitis virus strain from which to produce the vaccines.

Infectious laryngotracheitis is an acute, contagious, respiratory disease which annually strikes several million chickens and pheasants. It is caused by a filterable virus. The virus, which attacks the trachea and larynx of the infected bird, causes such symptoms as gasping, mouth breathing, rales, coughing and sometimes severe depression. In a seriously stricken bird, coughing may result in the expulsion of bloody mucus from the trachea. The excessive accumulation of inflammatory exudate and blood in the larynx, trachea or syrinx frequently kills affected birds by asphyxiation. Usually, the disease spreads rapidly through a flock, causing mortality, loss of weight in broiler flocks and the reduction of egg production in laying flocks.

In spite of the fact that the natural route of infection of the disease is the respiratory tract, for many years the recognized method for the prophylactic immunization of fowl against laryngotracheitis has been the application of virulent virus to the cloacal membrane or vent. Because of the virulence of the virus, its initial application through the respiratory route causes a dangerous local reaction in the inoculated fowl. Only revaccination can be safely conducted ocularly or intranasally. Cloacal vaccination is relatively safe because, in theory, the inoculated fowl develop a partial immunity before the virulent virus reaches the respiratory tract. While generally good immunization is achieved by the cloacal method, the method is objectionable because it is more difficult to perform than a respiratory tract inoculation, and because unvaccinated birds or vaccinated birds which did not develop a reaction to the vaccination may acquire the natural disease from virulent virus eliminated through the cloaca of a successfully vaccinated bird. A further objection to the conventional virulent virus, which must be applied by the vent route, is the fact that the duration of immunity provided by it is relatively short. A large percentage of the vaccinated birds, perhaps as high as 50 percent, may become susceptible to laboratory challenge about seven to twelve weeks following initial vaccination with it.

Even a greater drawback than the vent method of application which must be employed for today's virulent vaccines is the inherent danger in the use of the virulent vaccines themselves. Use of the present vaccines disseminates the virulent laryngotracheitis virus, which is a spreading, infectious agent for susceptible birds. Consequently, in the act of protecting some birds, the disease may be unintentionally but unavoidably spread to other birds. Despite the dangers, however, millions of birds are vaccinated each year with the virulent virus.

Numerous attempts to obtain substantially modified or attenuated laryngotracheitis virus strains have been recorded. Some researchers tried to attenuate the virulent virus by serially transferring the virus through chick embryos, but they were unable to decrease the virulence. Others, pursuing a different line of attack, were able to isolate naturally occurring strains of the virus from birds exhibiting respiratory symptoms not closely conforming to the classical description of the acute disease. These somewhat less virulent strains did not always show the usual virulence when administered to susceptible birds. Intranasal administration resulted in only transient respiratory distress, whereas application by atomization gave a severe reaction closely resembling the symptoms of classical laryngotracheitis. Continued testing has shown that there are only minor differences in the clinical response of susceptible birds inoculated with the usual laryngotracheitis virus and those inoculated with the apparently less virulent strains of the virus. The less virulent strains remain basically virulent and accordingly have not been developed into practical vaccines.

A primary object of my invention, therefore, is to provide an antigenic laryngotracheitis virus strain which is substantially modified.

Another object is to provide a modified laryngotracheitis vaccine which can be applied directly and initially to a bird's respiratory tract to impart local immunity to the respiratory tract tissue as well as systemic immunity.

Another object of my invention is to provide a method for producing a modified, antigenic laryngotracheitis virus strain and a method for producing a vaccine employing such a strain.

A further object of my invention is to provide various combinations of my modified laryngotracheitis vaccine with other kinds of live vaccines.

Other objects and advantages of my invention will be apparent from the following detailed description, taken in conjunction with the accompanying drawings.

The words "modified" and "attenuated," as used in this application, describe a virus which causes no, or only a local, reaction in the vaccinated birds at the site of application without any observable respiratory or systemic reactions.

The modified or attenuated strain of laryngotracheitis virus is obtained by a plurality of continuous serial passages of normal virulent laryngotracheitis virus through tissue cultures which are prepared by the usual laboratory techniques. Embryonic kidney or liver cells, which may be taken from either chickens or turkeys, are preferably used to prepare the cultures. Medium 199, Hank's, Earl's, or any other suitable medium may be used as the sustaining nutrient for the cells. The tissue culture passages themselves are performed using standard laboratory techniques.

The virus inoculated into the cell cultures is incubated for one to three days at 37° C. This period of time is satisfactory for the propagation of the virus in the cell cultures. Then the tissue culture fluids containing the virus are harvested by the aseptic aspiration of the contents of the tissue culture flasks. This virus fluid is transferred into a new set of cell cultures and further propagated. The maximum final dilution of the virus fluid in the cell culture fluid should not exceed 1:1000 at the time of the transfer. These passages are repeated until the modification of the virus occurs. In my work, I observed that modification starts to appear approximately at the twentieth passage. About forty passages were needed to have the modification of the virus described below.

Two significant changes in the functional characteristics of the normal virulent virus occur during the course of the continuous serial passages through the tissue cultures. The first of these changes concerns the kind of lesions produced in chorio-allantoic membranes when the tissue culture fluid containing the modified virus is titered in embryonating chicken eggs by the chorio-allantoic membrane method; the second concerns the change in the pathogenic effect of the virus strain in chickens.

Typically, normal laryngotracheitis virus produces large, solid, grayish white, easily observable lesions in chorio-allantoic membranes. In constrast the new, modified laryngotracheitis virus produces unique, atypical lesions in the form of small, pinpoint size, grayish pocks, which are sometimes surrounded by a wide translucent edema. In my work, these specific lesions first appeared among the typical lesions in the chorio-allantoic membrane of the chick embryo after approximately the twentieth tissue culture passage. At about 30 passages, both type of lesions were present in about equal number. From about the 30th passage, the atypical lesions were in the majority. After approximately 40 passages, the only kind of lesions observed to be produced by the modified virus on the chorio-allantoic membrane were the atypical lesions. While the atypical lesions will appear, increase in number and become predominant substantially in accordance with my above-stated observations, some variations in the production rate of such lesions by my new modified virus may be expected.

Laryngotracheitis virus produces a cytopathogenic effect in cell cultures of embryonic chicken livers. The cytopathogenic effect is the degeneration of the liver cells either in one large area or in a number of well-defined, usually well rounded, relatively large, darker areas. The substantially modified virus obtained by the processes described herein produces the effect in an incubation period of one day.

The most important change is the decreased virulence of the tissue culture adapted virus. It is known that a virulent virus such as the commercial vaccine viruses presently used for vent vaccination, administered ocularly, results in reactions such as serious swelling, lacrimation, conjunctivitis and nasal discharge frequently connected with severe respiratory signs as rales, gasping, coughing and severe depression. On the other hand, the tissue culture virus administered ocularly causes no or only a mild local reaction in the birds without any observable respiratory or systemic reactions. This characteristic change makes possible the application of the virus through the respiratory route.

The first step in the preparation of an antigenic, live vaccine from the modified laryngotracheitis virus strain is the growth of kidney or liver cells taken from chicken or turkey embryos on the surface of tissue culture flasks or as Maitland cultures. The preferred age of the embryos is sixteen or twenty-one days. The growth, which continues until a satisfactory amount of tissue is present, may conveniently take place at 37° C. Once the tissue culture achieves sufficient growth, the tissue culture flasks or the Maitland cultures, whichever are employed, are inoculated with the modified laryngotracheitis virus strain and then incubated for a period of two to four days.

The infected fluids and tissue are then harvested. When tissue culture flasks are used, harvesting is preferably accomplished by the aseptic aspiration of the contents of the flasks. When Maitland cultures are used, harvesting is accomplished by simply pouring off the infected fluids. The pooled yield of virus material harvested from the tissue cultures is then diluted with any suitable stabilizing agent. The final step in commercial production of the vaccine is the lyophilization of the vaccine.

Several advantages of the tissue culture modified laryngotracheitis vaccine are illustrated by the test data contained in the following table.

POTENCY TESTS AND DURATION OF IMMUNITY IN CHICKENS VACCINATED OCULARLY WITH TISSUE CULTURE MODIFIED LARYNGOTRACHEITIS VACCINE

Challenge Results

| Vaccination Age of Chickens | Time—Weeks Post-vaccination | Number Immune per Number Challenged | Percentage Immune, Percent |
|---|---|---|---|
| 51st vaccine passage: 6 weeks | 4 | 5/5 | 100 |
| | 5 | 5/5 | 100 |
| | 7 | 5/5 | 100 |
| | 9 | 5/5 | 100 |
| | 12 | 5/5 | 100 |
| | 15 | 5/5 | 100 |
| | 18 | 5/5 | 100 |
| | 22 | 5/5 | 100 |
| 2 weeks | 4 | 5/5 | 100 |
| | 5 | 5/5 | 100 |
| | 7 | 5/5 | 100 |
| | 9 | 5/5 | 100 |
| | 12 | 5/5 | 100 |
| | 15 | 5/5 | 100 |
| | 18 | 5/5 | 100 |
| | 22 | 5/5 | 100 |

The chickens were initially vaccinated ocularly with complete safety. If the chickens had been initially vaccinated ocularly with presently known virulent laryngotracheitis vaccines, the large majority would have suffered severe and dangerous respiratory reactions. Even though my new vaccine is modified and may thus be administered initially through the respiratory route, its antigenicity is fully as good as that of the virulent vaccines. Note the high rate of immunity achieved by use of the modified vaccine. In addition, the duration of immunity provided by the modified vaccine is noticeably longer than that provided by the vent application of the virulent vaccines. As shown in the table, the ocularly vaccinated chickens exhibited 100 percent immunity to challenge for a period of at least 22 weeks postvaccination.

While the modified laryngotracheitis vaccine can be applied to the cloaca like the virulent prior art vaccines, it can also, unlike the virulent vaccines, be initially applied safely to the respiratory tract. Respiratory tract inoculation, either to the nose or eye, is advantageous because the respiratory tract is the natural route of infection. Consequently, administration of the modified vaccine to the respiratory tract imparts immunity substantially equal to the immunity given by a natural outbreak of the disease. Moreover, as compared to the vent method of vaccination, respiratory tract vaccination is more easily and quickly performed. Other than permitting initial respiratory inoculation, the modified vaccine is advantageous because it greatly reduces possible infection or reinfection of the vaccinated birds' living area and possible spreading of the virulent laryngotracheitis virus to unvaccinated birds, two possibilities that almost unavoidably occur with the use of the prior art virulent vaccines.

It is understood that the present invention is not limited to the particular embodiments or methods herein described, but embraces all such modified forms thereof as come within the scope of the following claims.

I claim:
1. The method of producing a modified, antigenic laryngotracheitis vaccine which can be safely administered to fowl through the respiratory route, comprising the steps of:
   (a) forming a plurality of tissue cultures of material selected from the group consisting of embryonic poultry liver tissue cells and embryonic poultry kidney tissue cells,
   (b) serially passing a virulent, infectious laryngotracheitis virus through said cultures for a plurality of passages while maintaining said cultures at a temperature of about 30° to 40° C. for about 1 to 3 days for each of said passages, and
   (c) continuing said serial passages until the resulting virus-containing tissue culture fluid, when titered in embryonating chicken eggs by the chorio-allantoic membrane method, produces predominantly atypical, small, pin-point size, grayish pock-type lesions.

2. The method of producing a modified, live antigenic laryngotracheitis vaccine which can be safely administered to poultry through the respiratory route, comprising the steps of:
(a) forming a plurality of tissue cultures of material selected from the group consisting of embryonic poultry liver tissue cells and embryonic poultry kidney tissue cells,
(b) serially passing a virulent, infectious laryngotracheitis virus through said cultures for a plurality of passages while maintaining said cultures at a temperature of about 30° to 40° C. for about 1 to 3 days for each of said passages,
(c) continuing said serial passages until the resulting virus material is attenuated to permit its safe administration to fowl through the respiratory route,
(d) inoculating poultry tissue selected from the group consisting of embryonic liver cells and embryonic kidney cells with said resulting virus-containing tissue culture fluid,
(e) harvesting virus material from said cells, and
(f) diluting said virus material with a stabilizing solution.

3. A modified, live infectious laryngotracheitis vaccine which may be safely administered initially to fowl through the respiratory route and which imparts immunity from infectious laryngotracheitis to fowl when so administered, produced by the method of claim 2.

References Cited

Cox, Ann. N.Y. Acad. Sci., vol. 55, pp. 236–247, 1952.

Pulsford, Adelaide. Inst. Med. and Vet. Sci., Annual Report, vol 20, pp. 62–66, 1957–1958.

Veterinary Bulletin, volume 31, page 459 entry 2572, 1961 citing Chang et al., Avian Diseases 4, 384–390 (1960).

Veterinary Bulletin, volume 33, page 384, entry 2404, 1963 citing Watrach et al., Proc. Soc. Exp. Biol., New York, 112, 230–232 (1963).

LEWIS GOTTS, *Primary Examiner.*

JULIAN S. LEVITT, ELBERT L. ROBERTS,
*Examiners.*

R. L. HUFF, *Assistant Examiner.*